US011401176B2

(12) United States Patent
Jeon et al.

(10) Patent No.: US 11,401,176 B2
(45) Date of Patent: Aug. 2, 2022

(54) WATER PURIFIER

(71) Applicant: LG ELECTRONICS INC., Seoul (KR)

(72) Inventors: Jewook Jeon, Seoul (KR); Jungmin Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 864 days.

(21) Appl. No.: 16/319,603

(22) PCT Filed: Jan. 17, 2018

(86) PCT No.: PCT/KR2018/000804
§ 371 (c)(1),
(2) Date: Jan. 22, 2019

(87) PCT Pub. No.: WO2018/135857
PCT Pub. Date: Jul. 26, 2018

(65) Prior Publication Data
US 2020/0216331 A1    Jul. 9, 2020

(30) Foreign Application Priority Data
Jan. 18, 2017   (KR) .................. 10-2017-0008388

(51) Int. Cl.
C02F 1/32       (2006.01)
B67D 1/08       (2006.01)
C02F 1/00       (2006.01)

(52) U.S. Cl.
CPC ............... *C02F 1/325* (2013.01); *B67D 1/08* (2013.01); *C02F 1/003* (2013.01);
(Continued)

(58) Field of Classification Search
CPC .. C02F 1/325; C02F 1/003; C02F 2201/3222; C02F 2303/04; C02F 2307/10;
(Continued)

(56) References Cited

U.S. PATENT DOCUMENTS 6,182,453 B1    2/2001  Forsberg
8,137,538 B2 *  3/2012  Cassassuce ............ B01D 35/14
                                                    210/95
(Continued)

FOREIGN PATENT DOCUMENTS

CN      1281674      1/2001
CN      101242801    8/2008
(Continued)

OTHER PUBLICATIONS

International Search Report and Written Opinion dated Jul. 5, 2018 issued in Application No. PCT/KR2018/000804.
(Continued)

*Primary Examiner* — Benjamin R Shaw
(74) *Attorney, Agent, or Firm* — Ked & Associates, LLP

(57) ABSTRACT

Provided is a water purifier. The water purifier includes a water purifier body including a housing defining an outer appearance and a filter provided in the housing to filter raw water introduced from the outside, a water discharge module including a water discharge nozzle that protrudes forward from the water purifier body to supply the water passing through the filter to the outside of the water purifier body, and a tray disposed below the water discharge nozzle. The water discharge module includes a case having a lower end through which the water discharge nozzle is exposed, an ultraviolet (UV) lamp disposed above the water discharge nozzle in the case to emit ultraviolet rays to an inner surface of the water discharge nozzle, a protection window made of a light transmission material and disposed below the UV
(Continued)

lamp to protect the UV lamp against water, and at least one light source that irradiates light to the inside or outside of the water discharge nozzle according to turn-on/off of the UV lamp.

23 Claims, 10 Drawing Sheets

(52) U.S. Cl.
CPC .. *C02F 2201/3222* (2013.01); *C02F 2303/04* (2013.01); *C02F 2307/10* (2013.01)

(58) Field of Classification Search
CPC ...... C02F 2303/10; B67D 2210/00015; B67D 2001/075
USPC ........................................................ 222/190
See application file for complete search history.

(56) References Cited

U.S. PATENT DOCUMENTS

| | | | |
|---|---|---|---|
| 9,526,371 B2* | 12/2016 | Lo Foro | B65D 85/8058 |
| 2007/0163934 A1 | 7/2007 | Kim et al. | |
| 2009/0208386 A1* | 8/2009 | Barsky | C02F 1/32 |
| | | | 422/186.3 |
| 2009/0242075 A1* | 10/2009 | Busick | C02F 1/325 |
| | | | 141/85 |
| 2010/0178201 A1 | 7/2010 | Tribelsky et al. | |
| 2011/0159150 A1 | 6/2011 | Uen et al. | |
| 2016/0046508 A1 | 2/2016 | Orita | |
| 2018/0228928 A1* | 8/2018 | Ochi | C02F 1/32 |
| 2019/0142987 A1* | 5/2019 | Zhang | A61L 2/10 |
| | | | 250/435 |
| 2019/0241445 A1* | 8/2019 | Watanabe | A61L 2/10 |
| 2019/0359504 A1* | 11/2019 | Chao | C02F 1/325 |
| 2019/0389712 A1* | 12/2019 | Kim | B67D 1/0878 |
| 2020/0056565 A1* | 2/2020 | Duez | F02M 25/028 |
| 2020/0115212 A1* | 4/2020 | Kim | A61L 2/10 |
| 2020/0140291 A1* | 5/2020 | Babaie | C02F 1/325 |
| 2020/0247656 A1* | 8/2020 | Kwon | B67D 1/0887 |
| 2020/0308025 A1* | 10/2020 | Collins | C02F 1/325 |
| 2020/0377356 A1* | 12/2020 | Kim | B67D 1/0859 |
| 2021/0162084 A1* | 6/2021 | Frederiksen | A01J 7/025 |

FOREIGN PATENT DOCUMENTS

| | | |
|---|---|---|
| CN | 102107941 | 6/2011 |
| CN | 103657224 | 3/2014 |
| CN | 303533706 | 12/2015 |
| CN | 105776685 | 7/2016 |
| CN | 105923696 | 9/2016 |
| CN | 106256766 | 12/2016 |
| KR | 10-2008-0074612 | 8/2008 |
| KR | 10-2010-0066115 | 6/2010 |
| KR | 10-2010-0136797 | 12/2010 |
| KR | 10-2014-0069683 | 6/2014 |
| KR | 10-2015-0136112 | 12/2015 |

OTHER PUBLICATIONS

Indian Office Action dated Oct. 31, 2019 issued in IN Application No. 201917000577.
Chinese Office Action dated Mar. 11, 2020 issued in CN Application No. 201880003686.6.

* cited by examiner

| Time (min) | Removal rate (%) |
|---|---|
| 0.5 | 99.30 |
| 1 | 99.41 |
| 2 | 99.76 |
| 3 | 99.89 |
| 5 | 99.96 |
| 10 | 99.98 |

TABLE 1. STERILIZATION PERFORMANCE DEPENDING ON UV IRRADIATION TIME

WATER PURIFIER

CROSS-REFERENCE TO RELATED PATENT APPLICATIONS

This application is a U.S. National Stage Application under 35 U.S.C. § 371 of PCT Application No. PCT/KR2018/000804, filed Jan. 17, 2018, which claims priority to Korean Patent Application No. 10-2017-0008388, filed Jan. 18, 2017, whose entire disclosures are hereby incorporated by reference.

TECHNICAL FIELD

The present disclosure relates to a water purifier.

BACKGROUND ART

In general, water purifiers are being used for household purposes as mechanisms that filter water to remove impurities.

In detail, water purifiers are connected to a water supply system to remove floating matters or harmful components, which are contained in tap water and purify as much water as desired by user's manipulation to dispense the purified water.

As described above, water purifiers are being released in various products, which are capable of dispensing hot water and cold water as well as purified water. Also, in recent years, water purifiers capable of being installed in various installation environments with small sizes are being developed.

However, when such a water purifier is used in respective homes, institutions, or offices, bacteria on the hand and bacteria or dusts floating in the air are attached to a water discharge nozzle, through which purified water, cold water, and hot water are selectively dispensed, to contaminate the water discharge nozzle. Also, while water is dispensed through the water discharge nozzle to drink coffee or the like, impurities such as coffee come into contact with the water discharge nozzle to contaminate the water discharge nozzle. As a result, a large amount of bacteria may necessarily exist on the water discharge nozzle.

Also, since the water discharge nozzle of the water purifier always has water and is exposed to the air, bacteria may be reproduced.

However, since it is not easy for general users to clean the water discharge nozzle every day, there is a limitation that bacteria are reproduced on the water discharge nozzle.

Also, to prevent this phenomenon from occurring, a water purifier in which a lighting emitting ultraviolet rays is mounted in a water discharge nozzle has been disclosed.

However, the water purifier according to the related art has a limitation that ultraviolet rays are exposed to the outside of the water discharge nozzle to threaten safety of the user and a limitation that the user does not recognize whether the ultraviolet sterilization properly proceeds, and thus, the user feels a sense of deteriorated security or satisfaction.

Also, since the water purifier according to the related art does not reliably sure that the ultraviolet sterilization proceeds even in the state in which the ultraviolet sterilization does not proceed because the user does not recognize whether the water discharge nozzle is sterilized by the ultraviolet rays, and thus, a situation is also possible to unintentionally deceive the user.

Also, in the water purifier according to the related art, it is difficult to allow the user to check an amount of water in the cup under the condition in which a field of view is not ensured, and thus, there is a need to shine a light for checking the amount of water.

DISCLOSURE

Technical Problem

Embodiments provide a water purifier that is capable of allowing a user to always receive clean water through a water discharge nozzle that is sterilized.

Embodiments also provide a water purifier in which a user is capable of recognizing whether ultraviolet sterilization of the water purifier proceeds through a lighting having a specific color from the outside.

Embodiments also provide a water purifier that is capable of allowing a user to confirm how much water is filled in a cup placed on a tray under a condition a field of view is not secured.

Embodiments also provide a water purifier in which water flowing through the inside of a water discharge module is prevented from being splashed to a UV lamp, and ultraviolet rays emitted from the UV lamp are transmitted to a water discharge nozzle near 100% without loss to improve sterilization efficiency of the water discharge nozzle through the ultraviolet rays emitted from the UV lamp.

Embodiments also provide a water purifier in which ultraviolet rays emitted from a UV lamp are not exposed to the outside to prevent a user from being injured even though a user's finger is exposed to the water discharge nozzle of the water purifier.

Embodiments also provide a water purifier that is capable of allowing a user to more intuitively conform a fact in which an entire area of a water discharge nozzle is sterilized by ultraviolet rays when light emitted from a light source is emitted downward along a circumference of the water discharge nozzle through a ring-shaped diffusion member disposed to surround an outer circumferential surface of the water discharge nozzle.

Embodiments also provide a water purifier which is hygienic and capable of preventing a water discharge nozzle from being damaged and deformed.

Embodiments also provide a water purifier which is capable of preventing safety accident because short children do not recognize a manipulation part and also do not easily manipulate the manipulation part even though the children recognize the manipulation part.

Embodiments also provide a water purifier in which all of adults and short children are capable of recognizing a water discharge button and easily manipulating the water discharge button to dispense water when discharge of the water is required.

Technical Solution

In one embodiment, a water purifier includes: a water purifier body including a housing defining an outer appearance and a filter provided in the housing to filter raw water introduced from the outside; a water discharge module including a water discharge nozzle that protrudes forward from the water purifier body to supply the water passing through the filter to the outside of the water purifier body; and a tray disposed below the water discharge nozzle, wherein the water discharge module includes: a case having a lower end through which the water discharge nozzle is exposed; an ultraviolet (UV) lamp disposed above the water discharge nozzle in the case to emit ultraviolet rays to an inner surface of the water discharge nozzle; a protection window made of a light transmission material and disposed below the UV lamp to protect the UV lamp against water; and at least one light source that irradiates light to the inside or outside of the water discharge nozzle according to turn-on/off of the UV lamp. Thus, a user may always receive the clean water through the water discharge nozzle that is sterilized. Also, the user may recognize whether the ultraviolet sterilization of the water purifier proceeds through the lighting having the specific color from the outside.

The ultraviolet rays emitted from the UV lamp may not be exposed to the outside of the water discharge nozzle. Thus, the user's hand may be previously prevented from being injured by the ultraviolet rays that are exposed to the outside of the water discharge nozzle to improve safety.

A diffusion member made of a light transmission material may be disposed between the water discharge nozzle and the case, and the light emitted from the light source may be exposed to the outside of the water discharge nozzle through the diffusion member. Thus, the user may more intuitively conform the fact in which the entire area of the water discharge nozzle is sterilized by the ultraviolet rays when the light emitted from the light source is emitted downward along the circumference of the water discharge nozzle.

The light source may be provided as an LED and mounted on a bottom surface of a light source PCB, which is inclined to the water discharge nozzle. Thus, the light emitted from the light source may be concentrated into a lower side of the water discharge nozzle to allow the user to confirm more clear light from the outside of the water purifier.

The light source may be provided in plurality to emit light having at least two colors. At least one light source of the light sources may emit light when the ultraviolet rays are irradiated from the UV lamp and may emit light when water is dispensed from the water discharge nozzle. Thus, the user may confirm how much water is filled in the cup placed on the tray under the condition the field of view is not secured.

The protection window may be made of a quartz material. Thus, water flowing through the inside of the water discharge module may be prevented from being splashed to the UV lamp, and the ultraviolet rays emitted from the UV lamp may be transmitted to the water discharge nozzle near 100% without loss. Therefore, the sterilization efficiency of the water discharge nozzle may be improved through the ultraviolet rays emitted from the UV lamp.

The UV lamp may intermittently irradiate ultraviolet rays. Thus, the sterilization performance of the water discharge nozzle may be secured, and also, the power consumption may be reduced.

The external member may be made of a stainless steel material. Thus, the water discharge nozzle may not be rust to prevent damage and deformation from being occurring due to the frequent use. Also, the water purifier may be elegant in outer appearance and also additionally realize a luxurious image.

The internal member and the external member may be injection-molded to be integrated with each other. Thus, the coupling between the internal member and the external member may be improved to prevent water from leaking. Also, the manufacture may be facilitated when compared to the existing assembly method.

A manipulation part may be disposed on a top surface of the water discharge module. Thus, in case of short children, the children may not recognize the manipulation part and also may not easily manipulate the manipulation part even though the children recognize the manipulation part to prevent safety accidents from occurring.

A water discharge button may be disposed on a front surface of the water discharge module. All of the adults and the short children may recognize the water discharge button and easily manipulate the water discharge button when discharge of water is required to dispense the water.

The details of one or more embodiments are set forth in the accompanying drawings and the description below. Other features will be apparent from the description and drawings, and from the claims.

Advantageous Effects

The present disclosure has effects as follows.

According to the embodiment, the user may always receive the clean water through the water discharge nozzle that is sterilized.

According to the embodiment, the user may recognize whether the ultraviolet sterilization of the water discharge nozzle proceeds through the lighting having the specific color from the outside of the water purifier.

According to the embodiment, the user may confirm how much water is filled in the cup placed on the tray under the condition in which the field of view is not secured.

According to the embodiment, water flowing through the inside of the water discharge module may be prevented from being splashed to the UV lamp, and the ultraviolet rays emitted from the UV lamp may be transmitted to the water discharge nozzle near 100% without loss. Thus, the sterilization efficiency of the water discharge nozzle may be improved through the ultraviolet rays emitted from the UV lamp.

According to the embodiment, the ultraviolet rays emitted from the UV lamp may not be exposed to the outside of a water discharge nozzle to prevent the user from being injured even though the user's finger is exposed to the water discharge nozzle of the water purifier.

According to the embodiment, the user may more intuitively conform the fact in which the entire area of the water discharge nozzle is sterilized by the ultraviolet rays when the light emitted from the light source is emitted downward along the circumference of the water discharge nozzle through the ring-shaped diffusion member disposed to surround the outer circumferential surface of the water discharge nozzle.

According to the embodiment, the water purifier may be hygienic and capable of preventing the water discharge nozzle from being damaged and deformed.

According to the present invention, the safety accident may be prevented from occurring because the short children do not recognize the manipulation part, and also, the manipulation part may not easily manipulated even though the children recognize the manipulation part.

According to the embodiment, all of the adults and the short children may recognize the water discharge button and may easily manipulate the water discharge button to dispense water when the discharge of the water is required.

MODE FOR INVENTION

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

Figure 1:
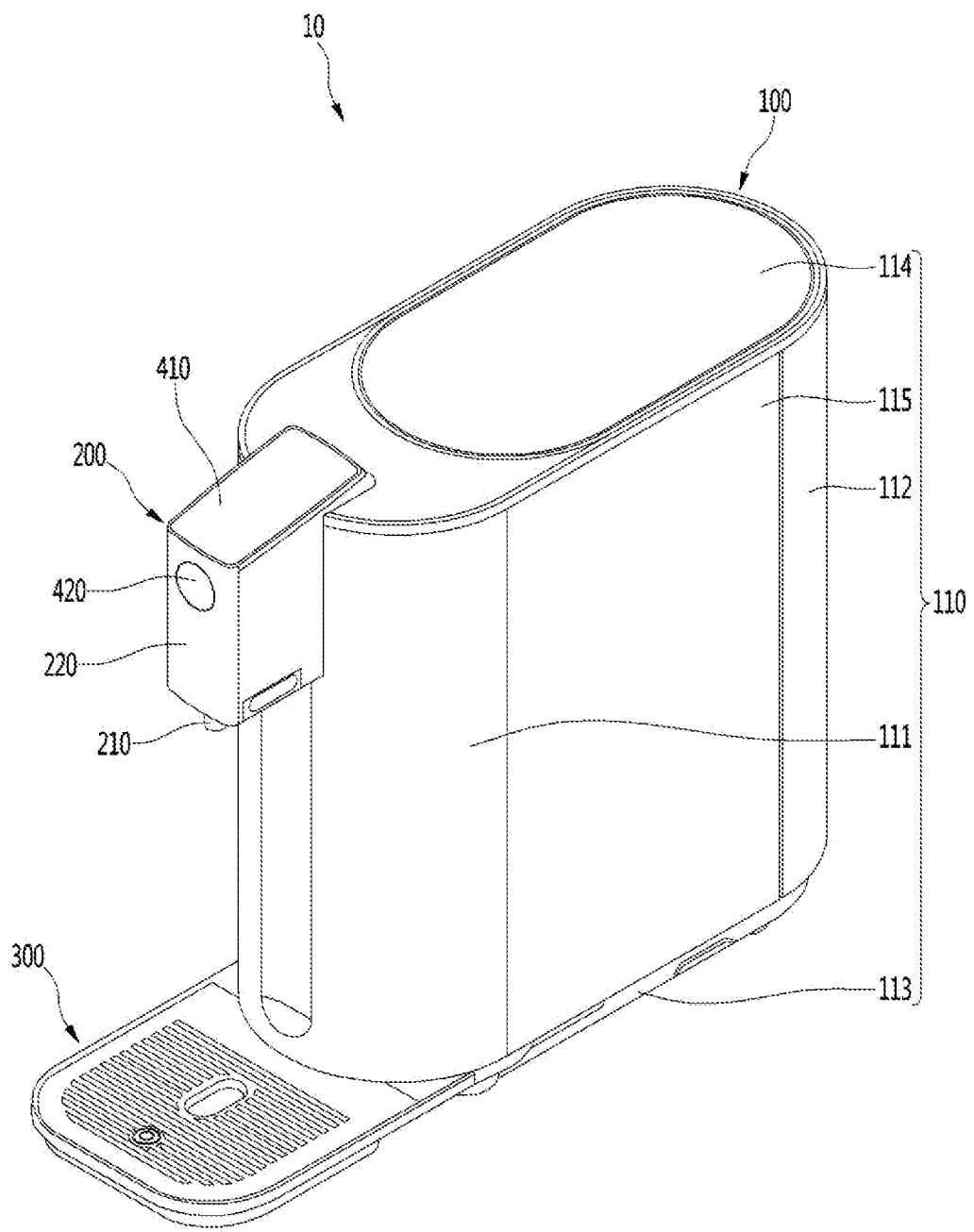
FIG. 1 is a perspective view of a water purifier according to an embodiment.

FIG. 1 is a perspective view of a water purifier according to an embodiment. Also, FIG. 2 is an exploded perspective view of the water purifier.

Figure 2:
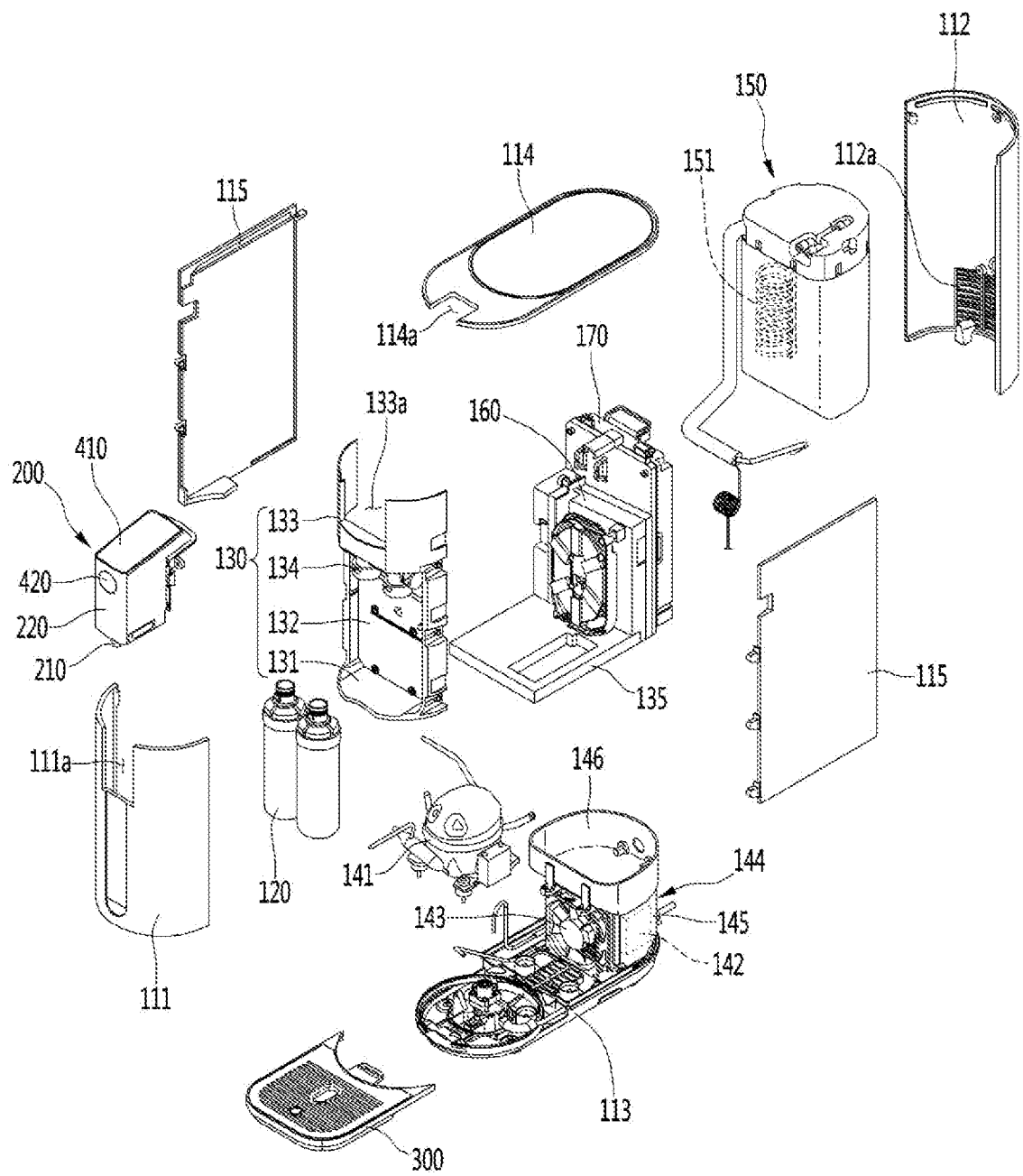
FIG. 2 is an exploded perspective view of the water purifier.

Referring to FIGS. 1 and 2, a water purifier 10 according to an embodiment may include a water purifier body 100 including a housing 110 defining an outer appearance and a filter 120 provided in the housing 110 to filter raw water introduced from the outside, a water discharge module 200 including a water discharge nozzle 210 that protrudes forward from the water purifier body 100 to supply the water passing through the filter 120 to the outside of the water purifier body 100, and a tray 300 disposed below the water discharge nozzle 210.

The outer appearance of the water purifier body 100 may be defined by the housing 110. The housing 110 includes a front cover 111 defining an outer appearance of a front surface, a rear cover 112 defining an outer appearance of a rear surface, a base 113 defining a bottom surface, a top cover 114 defining a top surface, and side panels 115 defining both left and right surfaces. The front cover 111, the rear cover 112, the base 113, the top cover 114, and the pair of side panels 115 may be assembled with each other to constitute the housing 110 defining the outer appearance of the water purifier body 100.

Here, each of front and rear ends of the base 113 and the top cover 114 may be rounded. Each of the front cover 111 and the rear cover 112 may protrude forward and backward to have a curvature corresponding to each of the front and rear ends of the base 113 and the top cover 114, which are rounded.

Also, the water discharge module 200 is disposed on the front surface of the water purifier body 100. The water discharge module 200 may protrude forward from the front cover 111 to dispense purified water through the water discharge nozzle 210 that protrudes downward.

For this, mounting grooves 111a and 114a may be defined in the front cover 111 and the top cover 114 so the water discharge module 200 is inserted and fixed.

In detail, the mounting groove 111a may have a shape that is recessed downward from a central upper end of the front cover 111, and the mounting groove 114a may have a shape that is recessed backward from a front end of the top cover 114.

The water discharge module 200 will be described below in more detail.

The filter 120 for purifying water and a filter bracket 130 on which a plurality of valves (not shown) are mounted may be provided in the housing 110.

The filter bracket 130 may include a bottom part 131 coupled to the base 113, a filter accommodation part 132 in which the filter 120 is accommodated, and a water discharge module mounting part 133 on which the water discharge module 200 is mounted.

In detail, the bottom part 131 may have a shape corresponding to that of the front end of the base 113 and be coupled to the base 113. The bottom part 131 may be coupled to fix a mounted position of the filter bracket 130 and define a shape of a bottom surface of the filter accommodation part 132.

The filter bracket 130 may be hooked to the base in a hook manner. Alternatively, the filter bracket 130 may be fixed by using a screw that is coupled to the bottom surface of the base 113.

The filter accommodation part 132 may extend in a vertical direction and define a space that is recessed backward (a right side in the drawing) from a front side (a left side in the drawing) to accommodate the filter 120. A plurality of filters 120 may be mounted on the filter accommodation part 132. The filter 120 may purify supplied raw water (tap water) and be constituted by combination of filters having various functions.

Also, a filter socket 134 on which the filter 120 is mounted may be further provided in the filter accommodation part 132. A tube through which the purified water flows may be provided in the filter socket 134 and connected to a plurality of valves (not shown). Thus, the raw water may sequentially pass through the filters 120 to flow to the valve (not shown) for supplying water.

The plurality of valves (not shown) may be provided in a rear surface (a right side in the drawing) of the filter accommodation part 132. The valves (not shown) may selectively supply purified water, cold water, and hot water to the filter 120, a cooling tank 150, an induction heating assembly 160, and the water discharge module 200.

The water discharge module mounting part 133 is disposed on an upper end of the filter accommodation part 132. The water discharge module mounting part 133 has a structure in which a mounting groove 133a is defined downward from an upper side in an upper end of the water discharge module mounting part 133 so that the water discharge module 200 is inserted and fixed. Here, the water discharge module mounting part 133 may have a curvature corresponding to that of the front cover 111 that covers a front side of the water discharge module mounting part 133. An upper portion of the filter bracket 130 may be covered by the top cover 114.

A compressor 141 and a condenser 142 are provided on the top surface of the base 113. Also, a cooling fan 143 is disposed between the compressor 141 and the condenser 142 to cool the compressor 141 and the condenser 142. An inverter-type compressor capable of adjusting cooling capacity by varying a frequency may be used as the compressor 141. Thus, the purified water may be efficiently cooled to reduce power consumption.

Also, the condenser 142 may be disposed at a rear side of the base 113 and also disposed at a position corresponding to a discharge hole 112a defined in the rear cover 112. The condenser 142 may have a structure in which a flat tube-type refrigerant tube is bent several times to efficiently use a space and improve heat-exchange efficiency and be accommodated in a condenser bracket 144.

A condenser mounting part 145 to which the condenser 142 is fixed and a tank mounting part 146 on which a cooling tank 150 for making cold water is mounted may be provided in the condenser bracket 144. The condenser mounting part 145 provides a space having a shape corresponding to the whole shape of the condenser 142 to accommodate the condenser 142. Also, the condenser mounting part 145 has portions that are opened and face the cooling fan 143 and the discharge hole 112a to effectively cool the condenser 142.

Also, the tank mounting part 146 is disposed on the condenser bracket 144, i.e., above the condenser mounting part 145. A lower end of the cooling tank 150 is inserted into the tank mounting part 146 to allow the tank mounting part 146 to fix the cooling tank 150.

The cooling tank 150 cools purified water to make cold water, and cooling water that is heat-exchanged with the introduced purified water is filled into the cooling tank 150. Also, an evaporator 151 for cooling the cooling water may be accommodated in the cooling tank 150. Also, the purified water may pass through the cooling tank 150 so as to be cooled.

A support plate 135 extending to the cooling tank 150 may be further provided at one side of the filter bracket 130. The support plate 135 may be disposed above the compressor 141 and extend from the filter bracket 130 up to the condenser bracket 144 to provide a space in which a heating and control module 160 and 170 are mounted.

The heating and control module 160 and 170 may include an induction heating assembly 160 for making hot water and a control assembly 170 for controlling an overall operation of the water purifier 10. The induction heating assembly 160 and the control assembly 170 may be coupled to each other to form one module and then be mounted on the support plate 135.

The induction heating assembly 160 may heat the purified water in an induction heating manner. The induction heating assembly 160 may immediately and quickly heat water when dispensing of hot water is manipulated and also may control an output of magnetic fields to heat the purified water at a desired temperature and thereby to provide the hot water to the user. Thus, hot water having a desired temperature may be dispensed according to the user's manipulation.

The control assembly 170 may control an operation of the water purifier 10. That is, the control assembly 170 may control the compressor 141, the cooling fan 143, various valves and sensors, and the induction heating assembly 160. The control assembly 170 may be provided as a module by combination of PCBs that are divided into a plurality of parts for each function. Also, in a structure for dispensing only cold water and purified water from the water purifier 10, a PCB for controlling the induction heating assembly 160 may be omitted, and also, at least one or more PCBs may be omitted in the above-described manner.

Hereinafter, the water discharge module that is a portion of the component according to an embodiment will be described in more detail.

Figure 3:
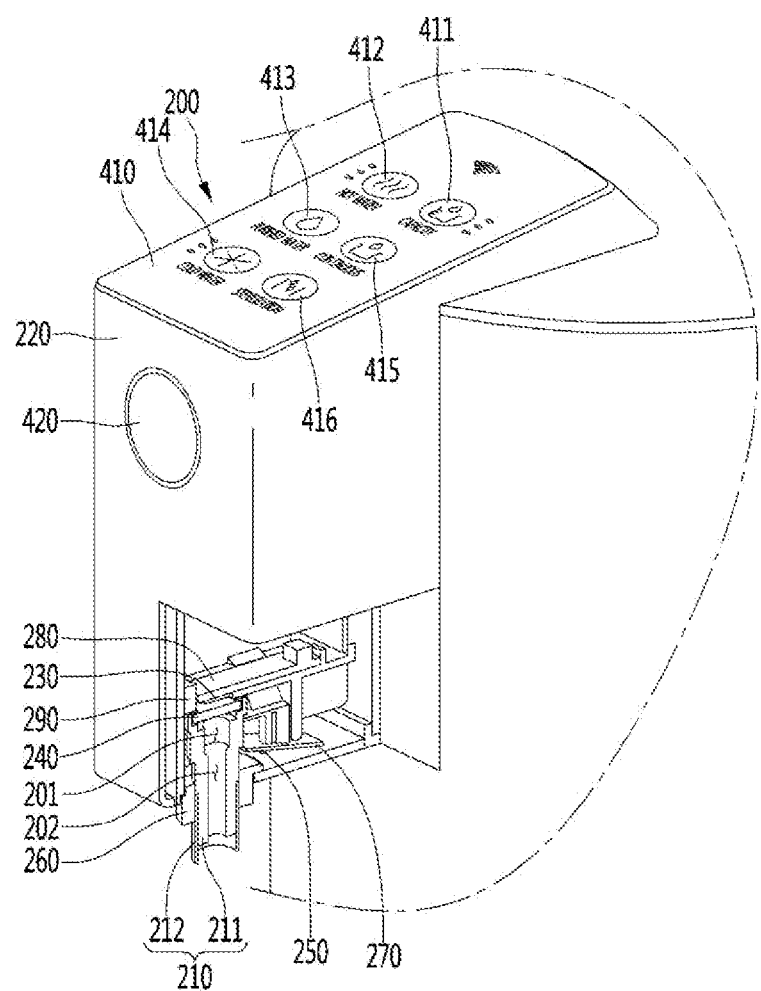
FIG. 3 is a partial cutaway perspective view of a water discharge module that is a portion of components according to an embodiment.
Figure 4:
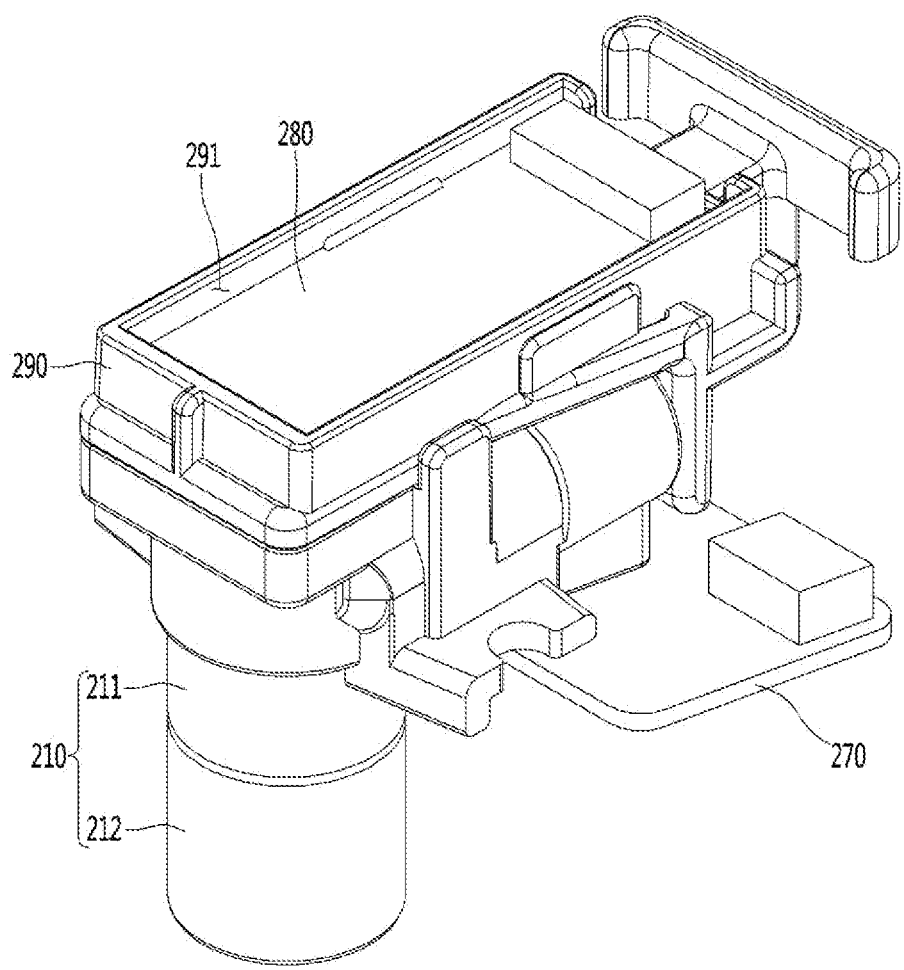
FIG. 4 is a perspective view of the water discharge module from which a case is removed in FIG. 3.

FIG. 3 is a partial cutaway perspective view of the water discharge module that is a portion of the components according to an embodiment. Also, FIG. 4 is a perspective view of the water discharge module from which a case is removed in FIG. 3. Also, FIG. 5 is a longitudinal cross-sectional view of the water discharge module that is a portion of the components according to an embodiment.

Figure 5:
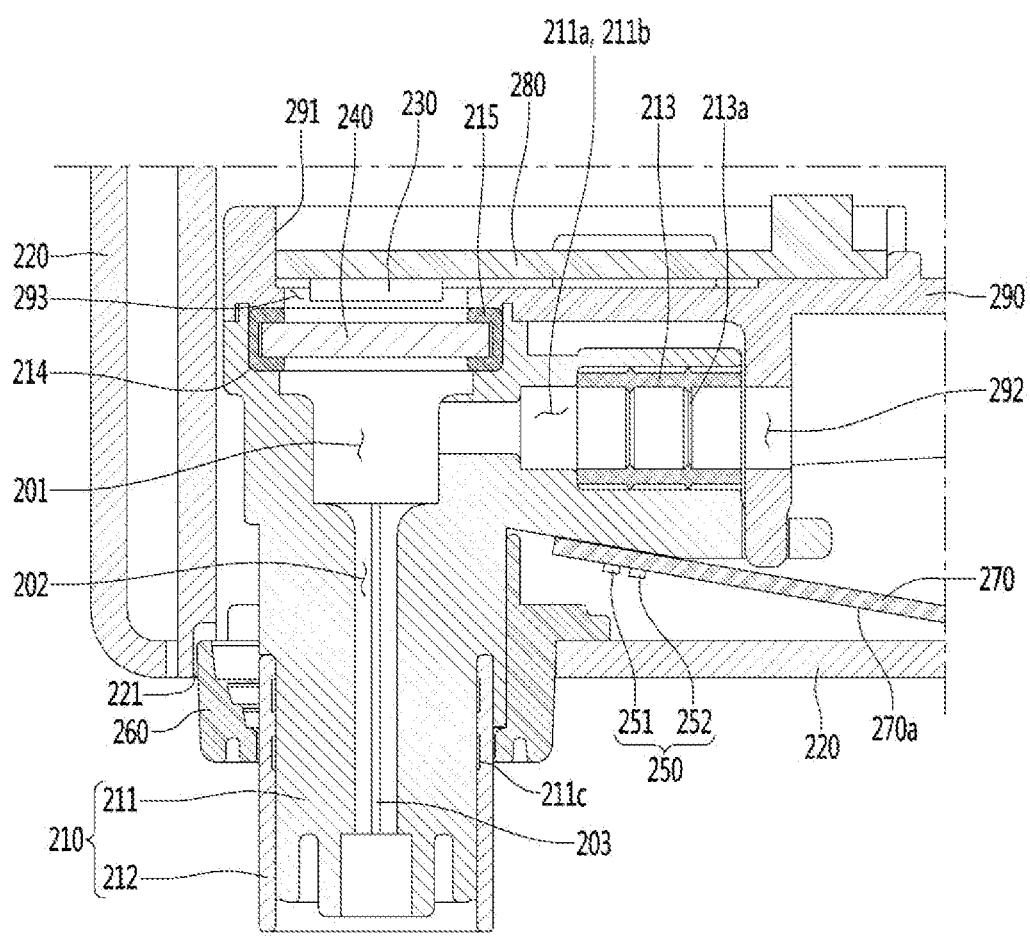
FIG. 5 is a longitudinal cross-sectional view of the water discharge module that is a portion of the components according to an embodiment.

Referring to FIGS. 3 to 5, the water discharge module 200 includes a case 220 having a lower end through which the water discharge nozzle 210 is exposed, an ultraviolet (UV) lamp 230 disposed above the water discharge nozzle 210 in the case 220 to emit ultraviolet rays to an inner surface of the water discharge nozzle 210, a protection window 240 made of a light transmission material and disposed below the UV lamp 230 to protect the UV lamp 230 against water, and at least one light source 250 that irradiates light to the inside or outside of the water discharge nozzle 210 according to turn-on/off of the UV lamp 230.

The UV lamp 230 is disposed above the water discharge nozzle 210 to emit the ultraviolet rays. The ultraviolet rays emitted from the UV lamp 230 sterilize an inner space of the water discharge nozzle 210. Thus, the user may always receive clean water through the water discharge nozzle that is sterilized.

For example, the UV lamp 230 may be provided as a UV LED that emits ultraviolet rays. Also, the UV lamp 230 may emit ultraviolet rays having a wavelength of about 300 nm to about 400 nm, particularly, about 380 nm.

In this embodiment, the UV LED may be mounted on a UV LED PCB 280.

Also, the protection window 240 may be provided to prevent water flowing along the inside of the water discharge module 200 from being splashed to the UV lamp 230.

In detail, the protection window 240 may be made of a transparent glass or plastic material to transmit the ultraviolet rays emitted from the UV lamp 230 to the water discharge nozzle 210. Also, the protection window 240 prevents water passing through the water discharge nozzle 210 from being splashed to the UV lamp 230.

For example, the protection window 240 may be made of transparent quartz glass.

In case of quartz (SiO2 99.9%), a light transmission ratio reaches about 96%. Particularly, the quartz is known to have water resistance while having a high UV transmission ratio. Thus, when the protection window 240 is made of the quartz material, the water flowing through the inside of the water discharge module 200 may be prevented from being splashed to the UV lamp 230, and also, the ultraviolet rays emitted from the UV lamp 230 may be transmitted to the water discharge nozzle near 100% without loss. Thus, sterilization efficiency of the water discharge nozzle 210 may be improved through the ultraviolet rays emitted from the UV lamp 230.

The light source 250 irradiates light to the inside or outside of the water discharge nozzle 210 according to turn on/off of the UV lamp 230.

For example, when the UV lamp 230 is turned on, the light source 250 may be turned on to irradiate light to the inside or outside of the water discharge nozzle 210. Also, when the UV lamp 230 is turned off, the light source 250 is turned off.

On the other hand, when the UV lamp 230 is turned on, the light source 250 may be turned off. Also, when the UV lamp 230 is turned off, the light source 250 may be turned on.

An object of the light source 250 is to inform whether the UV sterilization is performed to the user. Thus, the light emitted from the light source 250 has to have brightness that is enough to allow the user to recognize the light when the light is exposed to the outside of the water discharge module 200 in parallel to the water discharge nozzle 210 after being emitted from the light source 250.

As described above, since the light source 250 is provided, the user may visually confirm whether the UV sterilization is performed through the light exposed to the outside of the water discharge module 200 in parallel to the water discharge nozzle 210 from the outside of the water purifier.

The light source 250 may be provided as an LED. Also, the LED may be mounted on the light source PCB 270. The light source PCB 270 may be disposed on an upper portion or a side of the water discharge nozzle 210. Also, the light source PCB 270 may be fixed to the water discharge nozzle 210, fixed to an upper frame 290, or fixed to the inside of the case 220.

Also, the upper frame 290 on which the UV lamp 230 is seated may be disposed on the water discharge nozzle 210.

If the UV lamp 230 is provided as an UV LED, an accommodation groove 291 in which the UV LED PCB 280 is seated may be defined in the upper frame 290.

Also, an opening 293 through which the UV LED mounted on a bottom surface of the UV LED PCB 280 is exposed to the water discharge nozzle 210 may be defined in the upper frame 290.

Thus, the ultraviolet rays emitted from the UV LED may be irradiated to the water discharge nozzle 210 through the opening 293 to perform the UV sterilization of the water discharge nozzle 210.

Also, the ultraviolet rays emitted from the UV lamp 230 may be irradiated to only the inside of the water discharge nozzle 210 without being exposed to the outside of the water discharge nozzle 210.

That is, the ultraviolet rays emitted from the UV lamp 230 may have a boundary that is defined at the lowermost end of the water discharge nozzle 210.

It is known that the cumulative exposure dose of ultraviolet rays to human skin during the day is about 3 mJ/cm2.

If the ultraviolet rays emitted from the UV lamp 230 are exposed to the outside of the water discharge nozzle 210, the ultraviolet rays may have a bad influence on the user.

Thus, the output of the UV lamp 230 may be adjusted so that the boundary of the ultraviolet rays emitted from the UV lamp 230 is disposed at the lowermost end of the water discharge nozzle 210, or the UV lamp 230 may be adjusted in height to adjust a distance between the UV lamp 230 and the water discharge nozzle 210.

As described above, when the ultraviolet rays emitted from the UV lamp may not be exposed to the outside of the water discharge nozzle 210, the user may not be injured even through a user's finger is exposed to the water discharge nozzle 210 of the water purifier.

Also, a diffusion member 260 made of a light transmission material may be disposed between the water discharge nozzle 210 and the case 220. The light emitted from the light source 250 may be exposed to the outside of the water discharge nozzle 210 through the diffusion member 260.

In this embodiment, the diffusion member 260 may be provided in a ring shape.

In detail, an installation hole 221 through which the water discharge nozzle 210 passes is defined in the lower end of the case 220. Here, a clearance may be provided between the water discharge nozzle 210 and the installation hole 221, and the diffusion member 260 may be inserted into the clearance.

As described above, since the diffusion member 260 is made of the light transmission material, the light emitted from the light source 250 installed in the case 220 may be exposed to the outside of the case 220 through the diffusion member 260. Thus, the user may recognize the light emitted from the light source 250 from the outside of the water purifier.

Here, the diffusion member 260 may simply transmit the light emitted from the light source 250 as wall as diffuse the light to transmit the diffused light therethrough. That is, the diffusion member 260 may serve as a diffuser of the LED lighting.

As described above, when the light emitted from the light source 250 is emitted in a ring shape along the water discharge nozzle 210 through the ring-shaped diffusion member 260 disposed to surround an outer circumferential surface of the water discharge nozzle 210, the user may intuitively conform a fact in which an entire area of the water discharge nozzle 210 is sterilized by the ultraviolet rays. Also, the light emitted from the light source 250 may be utilized as a lighting that shines a cup placed on the tray 300.

As a modified example, the light source 250 may be mounted outside the case 220.

Also, the light source 250 may be provided as an LED and mounted on a bottom surface 270a of the light source PCB 270, which is disposed inclined to the water discharge nozzle.

As described above, when the LED is mounted on the bottom surface 270a of the light source PCB 270, light emitted from the LED may be concentratedly emitted into only a lower side, but be blocked to an upper side by the light source PCB 270. Also, since the bottom surface 270a of the light source PCB 270 is inclined to the diffusion member 260, the light emitted from the LED mounted on the bottom surface 270a of the light source PCB 270 may be directly irradiated to the diffusion member 260 and also be exposed to the outside of the case 220 through the diffusion member 260.

Also, the light source 250 may be provided in plurality and output light having at least two colors.

As described above, when the light source 250 is provided in plurality, intensities of the light sources 250 may be adjusted according to situations.

Also, when the light source 250 emits light having a plurality of colors, the colors of the light emitted from the light sources 250 may be adjusted according to various situations.

For example, the light source 250 may include a first LED 251 emitting light having a blue color and a second LEDC 252 emitting light having a white color.

As described above, when the light source 250 is provided in plurality, light having various colors may be emitted according to the situations to inform the situations to the user.

First, when the UV sterilization of the water discharge nozzle 210 is performed, the first LED 251 may be turned on to emit light having the blue color around the water discharge nozzle 210. Thus, the user may recognize whether the ultraviolet sterilization of the water discharge nozzle 210 proceeds through the lighting having the specific color from the outside of the water purifier.

Also, when the discharge of water through the water discharge nozzle 210 is performed by the manipulation of the water discharge button 420, the second LED 252 may be turned on to emit light having the white color around the water discharge nozzle 210. Thus, the user may confirm how much water is filled in the cup placed on the tray 300 under a condition in which a field of view is not secured. Also, the light source 250 may be utilized as a mood lighting.

A seating part 214 on which the protection window 240 is seated may be disposed on the water discharge nozzle 210, and a sealing member 215 made of an elastic material to provide sealing may be disposed between the protection window 240 and the seating part 214. For example, the sealing member 215 may be made of silicon. Since the sealing member 215 is provided, water passing through the water discharge nozzle 210 may be prevented from leaking between the seating part 214 and the protection window 240. Also, a manipulation part 410 may be disposed on a top surface of the water discharge module 200, and the water discharge button 420 may be disposed on a front surface of the water discharge module 200.

As described above, to provide the manipulation part 410 to the top surface of the water discharge module 200, an accommodation space in which the manipulation part 410 is accommodated may be defined in the top surface of the case 220.

According to an embodiment, the manipulation part 410 may be disposed on the top surface of the water discharge module 200. Thus, tall adults may easily adjust an overall operation of the water purifier 10. On the other hand, short child may not recognize the manipulation part 410 disposed on the top surface of the water discharge module 200 and also prevent safety accidents such as burning of the hand due to hot water from occurring when the child randomly push the manipulation part 410 to dispense the hot water.

On the other hand, the water discharge button 420 may be disposed on the front surface of the water discharge module 200. Thus, all the adults and the short child may recognize the water discharge button 420 and also easily manipulate the water discharge button 420 to dispense water when discharge of the water is required.

For example, the manipulation part 410 may be provided as a touch panel and include a capacity button 411 for selecting a capacity of water to be discharged, a hot water button 412 for selecting hot water and a temperature of the hot water to be discharged, a purified water button 413 for selecting purified water, a cold water button 414 for selecting cold water, a continuous button 415 for selecting continuous discharge, and a sterilization button 416 for turning on/off UV sterilization.

Figure 6:
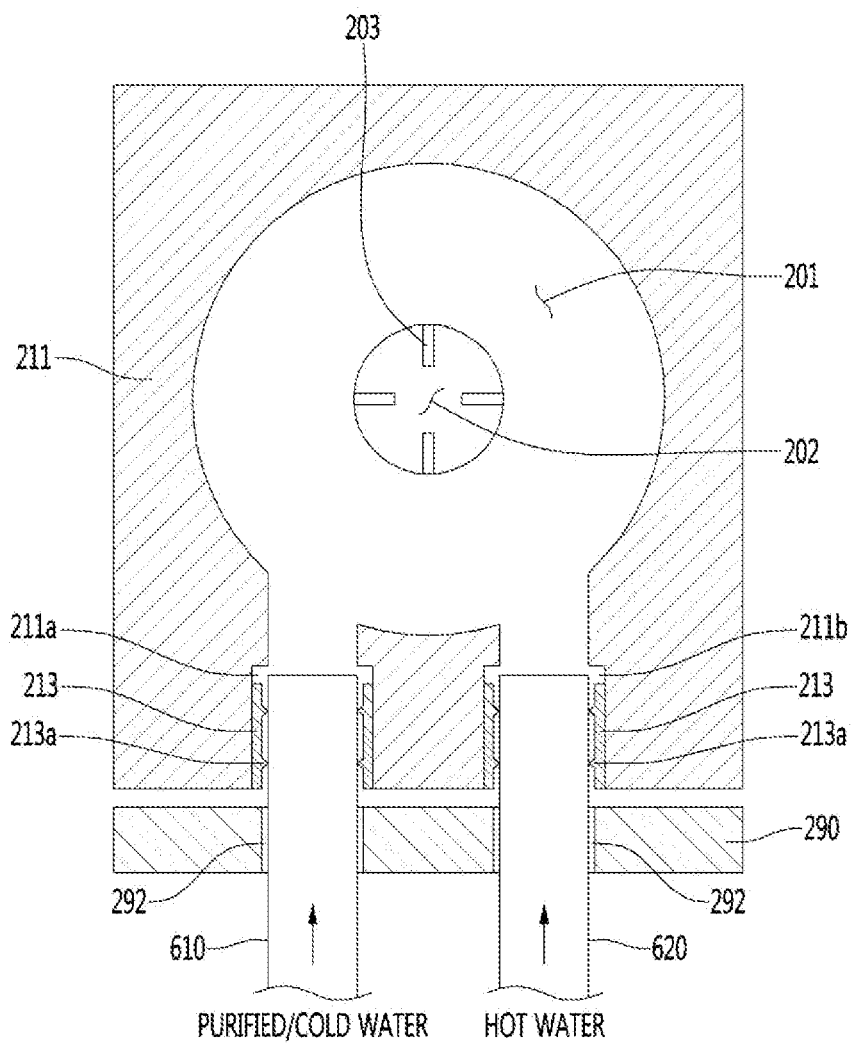
FIG. 6 is a transversal cross-sectional view of the water discharge module that is a portion of components according to an embodiment.

FIG. 6 is a transversal cross-sectional view of the water discharge module that is a portion of the components according to an embodiment.

Referring to FIG. 6, the water discharge module 200 may further include a chamber 201 disposed below the protection window 240 to transfer the cold water or the purified water introduced through a first hose 610 and transfer the hot water introduced through a second hose 620 to the water discharge nozzle 210.

For example, the chamber 201 may be provided above the water discharge nozzle 210. Thus, all of the cold water or the purified water introduced through the first hose 610 and the hot water introduced through the second hose 620 may meet in the chamber 201 or be discharged to the outside of the water discharge nozzle 210 after passing through the chamber 201 although meeting in the chamber 201.

Also, the water discharge nozzle 210 may include an internal member 211 having a hollow 202, through which water is discharge, therein and an upper end connected to the protection window 240 and an external member 212 connected to an outer end of the internal member 211 and exposed to the outside of the case 220.

Here, the chamber 201 communicating with the hollow 202 may be provided above the internal member 211. The chamber 201 may have a diameter greater than that of the hollow 202.

Also, a plurality of ribs 203 protruding to a central portion may be disposed along a water discharging direction on an inner surface of the hollow 202. The ribs 203 may hold a shape of a water stream and improve eddy current.

Also, the internal member 211 may have a first connection hole 211*a* into which the first hose 610 for supplying the cold water or the purified water is inserted and a second connection hole 211*b* into which the second hose 620 for supplying the hot water is inserted. The first connection hole 211*a* and the second connection hole 211*b* may communicate with the hollow 202. Thus, the cold water or the purified water transferred to the first hose 610 and the hot water transferred to the second hose 620 may be supplied to the chamber 201.

Also, a hollow packing part 213 having elasticity may be disposed on each of the first and second connection holes 211*a* and 211*b*. Here, each of the first and second hoses 610 and 620 may be press-fitted into the packing part 213. For example, the packing part 213 may be made of a silicon material.

Also, a protrusion 213*a* may be disposed in a circumferential direction on an inner circumferential surface of the packing part 213. For example, the protrusion 213*a* may have a ring shape.

As described above, since the packing part 213 on which the protrusion 213*a* is disposed is provided, the first hose 610 and the second hose 620 may be more respectively firmly fixed to the first connection hole 211*a* and the second connection hole 211*b* to prevent water from leaking between the first connection hole 211*a* and the first hose 610 and between the second connection hole 211*b* and the second hose 620.

Also, the external member 212 may be made of a stainless steel material.

As described above, when the external member 212 exposed to the outside of the case 220 is made of the stainless steel material, the water discharge nozzle 210 may be hygienic because it does not rust and prevent damage and deformation from being occurring due to the frequent use. Also, the water purifier 10 may be elegant in outer appearance and also additionally realize a luxurious image.

Also, the internal member 211 and the external member 212 may be injection-molded to be integrated with each other.

Here, the external member 212 may be made of a metal material, and the internal member 211 and the external member 212 may be integrated with each other in an insert-injection manner. Thus, coupling between the internal member 211 and the external member 212 may be improved to prevent water from leaking. Also, the manufacture may be facilitated when compared to the existing assembly method.

Here, to improve the coupling between the internal member 211 and the external member 212, a protrusion part 211*c* may be disposed on an outer circumferential surface of the internal member 211, and a groove part into which the protrusion part 211*c* is inserted may be defined in an internal circumferential surface of the external member 212.

Figure 7:
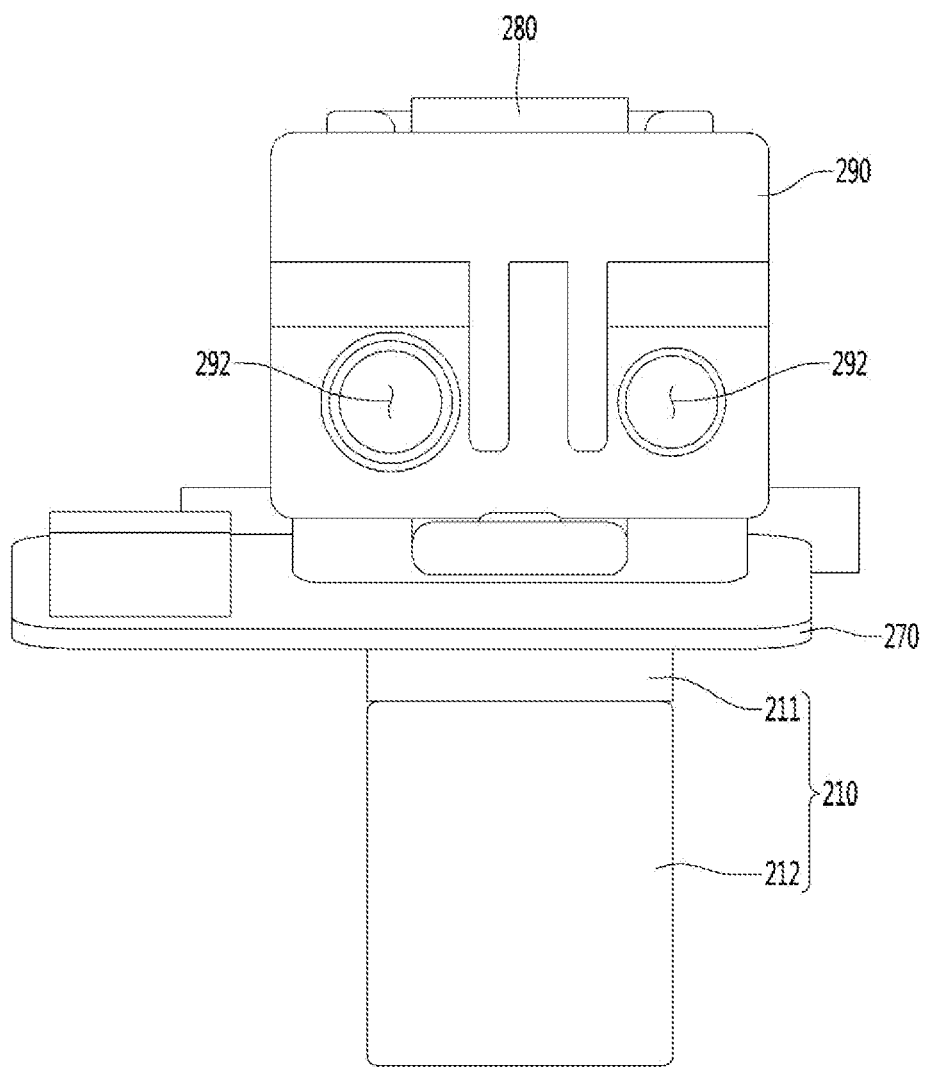
FIG. 7 is a rear perspective view of the water discharge module that is a portion of components according to an embodiment.

FIG. 7 is a rear perspective view of the water discharge module that is a portion of the components according to an embodiment.

Referring to FIGS. 6 and 7, a pair of through-holes 292 into which the first hose 610 and the second hose 620 are respectively inserted may be defined in the upper frame 290. Here, the through-holes 292 communicate with the first connection hole 211*a* and the second connection hole 211*b*. Thus, the first hose 610 and the second hose 620, which pass through the through-holes 292, may be inserted into the first connection hole 211*a* and the second connection hole 211*b*, respectively.

As described above, due to the configuration of the upper frame 290, the first hose 610 and the second hose 620 may be inserted into the first connection hole 211*a* and the second connection hole 211*b* after being primarily inserted into the through-holes 292. As a result, supporting force of the first and second hoses 610 and 620 may be secured.

Figures 8, 9:
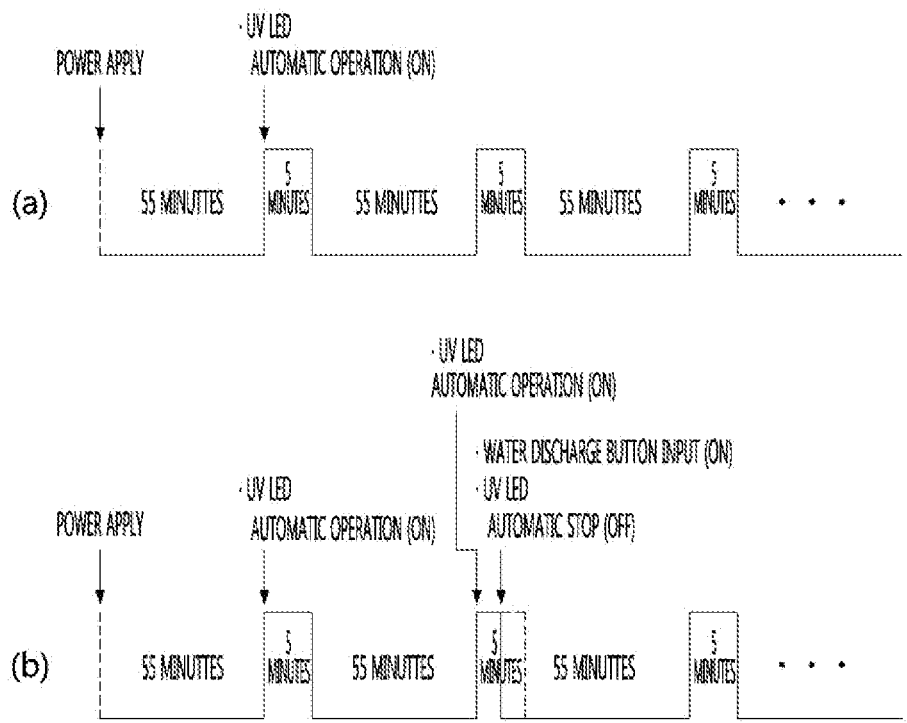
FIG. 8 is a view illustrating an example of a turn-on/off signal inputted into a UV lamp.
FIG. 9 is a comparison graph illustrating sterilization performance depending on a UV irradiation time.

FIG. 8 is a view illustrating an example of a turn-on/off signal inputted into the UV lamp. Also, FIG. 9 is a comparison graph illustrating sterilization performance depending on a UV irradiation time.

Referring to FIG. 8, the UV lamp 230 may intermittently irradiate ultraviolet rays.

Although the UV lamp 230 continuously emits the ultraviolet rays, the water discharge nozzle 210 may be sterilized while turning on/off the UV lamp 230.

When the UV lamp 230 intermittently irradiates the ultraviolet rays as described above, the sterilization performance of the water discharge nozzle 210 may be secured, and also, power consumption may be reduced.

For example, the UV lamp 230 may be turned on for about 5 minutes and turned off for about 55 minutes. This operation may be repeatedly performed.

Referring to FIG. 9, the sterilization performance depending on an irradiation time of the UV LED (about 1 mV) may be confirmed. When the UV LED (1 mV) is turned on for about 5 minutes to irradiate the ultraviolet rays, it is seen that sterilization of about 99.96% is achieved.

Thus, when the ultraviolet rays are irradiated for only about 5 minutes, since the sterilization of about 99.9% or more is maintained, the UV lamp 230 may be turned on for only about 1 hour 5 minutes.

Hereinafter, a method for sterilizing the water purifier by using the ultraviolet rays will be described.

Referring to FIG. 8A, when power of the water purifier is turned on, a timer may operate to detect a turn-on/off time of the UV lamp 230.

Here, the UV lamp 230 may be set so that the UV lamp 230 is repeatedly turned on for about 5 minutes and off for about 55 minutes.

After the power of the water purifier is applied, when the turn-off time of the UV lamp 230, which is detected by the timer, reaches about 55 minutes, the UV lamp 230 is turned on. That is, the sterilization of the water discharge nozzle 210 proceeds while the UV lamp 230 is turned on. While the UV lamp 230 is turned on as described above, the light source 250 may emit light having the blue light to allow the user to visually recognize that the UV sterilization proceeds.

Thereafter, when the turn-on time of the UV lamp 230, which is detected by the timer, reaches about 5 minutes, the UV lamp 230 is turned off. That is, the UV lamp 230 is turned off. Also, the light source 250 is turned off.

Thereafter, the UV lamp is turned off for about 55 minutes and on for about 5 minutes, and this process is repeated.

However, as illustrated in FIG. 8B, in the state in which the UV lamp 230 is turned on, when water is dispensed from the water discharge nozzle 210, the UV lamp 230 is turned off. Here, the blue light of the light source 250 may be turned off.

Also, in the state in which the UV lamp 230 is turned off due to break-down or the like, the blue light of the light source 250 is also turned off.

That is, the user may immediately take a measure when the user visually confirms that the VU sterilization does not proceed from the outside. Also, in the state in which the UV sterilization does not proceed, the user may not suspect that the UV sterilization is proceeding. That is, a situation in which the user is unintentionally deceived may be prevented.

Also, in the state in which the UV lamp 230 is turned off, when water is dispensed from the water discharge nozzle 210, the light source 250 may emit white light to the cup placed on the tray 300.

Hereinafter, a process for dispensing water in the water purifier having the above-described structure according to another embodiment will be described.

Figure 10:
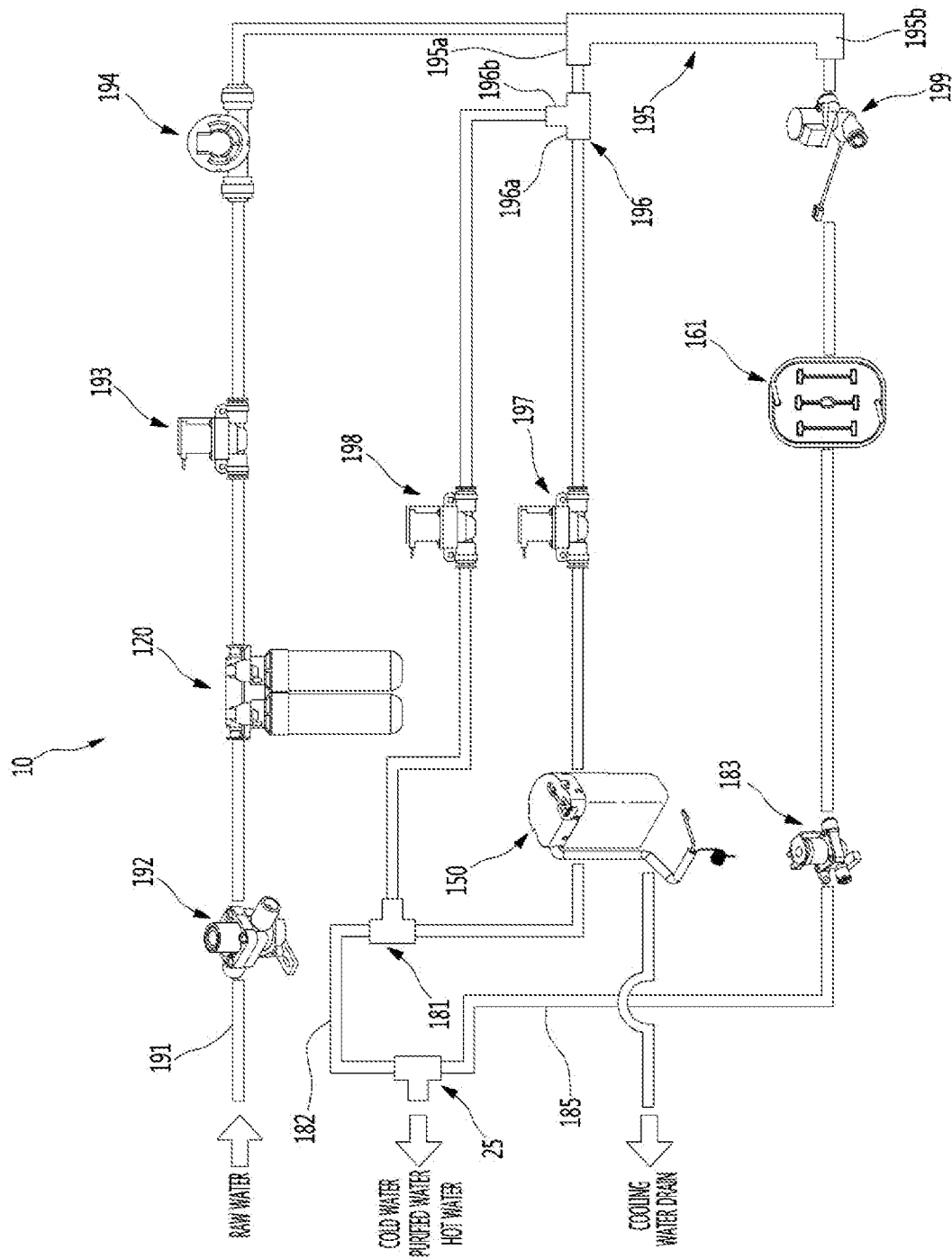
FIG. 10 is a schematic circuit diagram illustrating a flow path of water in the water purifier.
Figure 11:
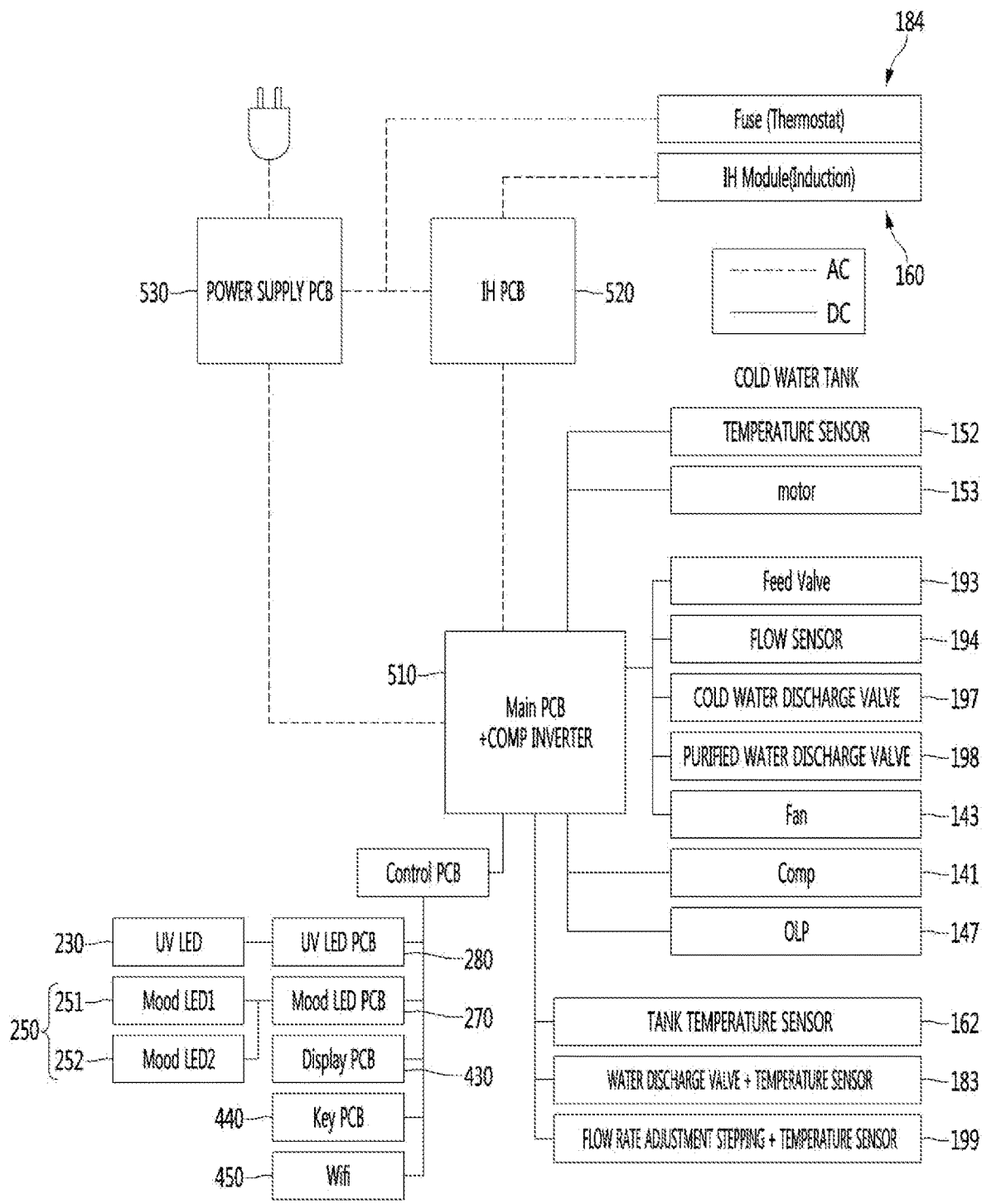
FIG. 11 is a block diagram illustrating a flow of a control signal in the water purifier.

FIG. 10 is a schematic circuit diagram illustrating a flow path of water in the water purifier. Also, FIG. 11 is a block diagram illustrating a flow of a control signal in the water purifier.

Referring to FIGS. 18 and 19, the water inflow tube 181 of the water purifier 10 is connected to the water supply system to receive raw water. The water inflow tube 191 is connected to the pressure sensitive valve 192, and the raw water passing through the pressure sensitive valve 192 is decompressed to a preset pressure for the operation of the water purifier 10.

Also, the decompressed raw water flows to the filter 120 along the tube connecting the pressure sensitive valve 192 to the filter 120. Foreign substances contained in the raw water may be removed while passing through the filter 120, and then, the water may be purified. Also, a feed valve 193 may be opened to allow the purified water to sequentially pass through the feed valve 193 and a flow sensor 194 along the tube.

Here, the feed valve 193 and the flow sensor 194 may be connected to a main PCB 510. A degree of opening of the feed valve 193 may be adjusted according to a signal transmitted to the main PCB 510. Also, information with respect to a flow rate detected by the flow sensor 194 may be transmitted to the main PCB 510 and used as data for controlling the water purifier.

The purified water passing through the flow sensor 194 may be branched into a cold and purified water side 195*a* and a hot water side 195*b* through a branch tube 195.

First, the purified water flowing to the tube of the cold and purified water side 195*a* may be branched again into a cold water side 196 and a purified water side 196*b* by a T connector 196 and then respectively connected to a cold water discharge valve 197 and a purified water discharge valve 198. The purified water discharge valve and the cold water discharge valve 197 may be connected to the main PCB 510 and thus be opened and closed by the control of the main PCB 510. That is, the purified water discharge valve 198 and the cold water discharge valve 197 may be selected by user's setting. The water discharge button 420 may be manipulated to open the selected valve and dispense water.

The water passing through the cold water discharge valve 197 may pass through a cooling coil within the cooling tank 150. The water flowing along the cooling coil is heat-exchanged with cooling water within the cooling tank 150. For this, the cooling water may be cooled to be maintained at a preset temperature.

To cool the cooling water, the compressor 141 connected to the main PCB 510 is driven. The driving of the compressor 141 may be determined by a cold water temperature sensor 152 provided in the cooling tank 150. Thus, the cooling water may be always maintained at the preset temperature. For this, the driving of the compressor 141 may be controlled. The compressor 141 may be adjusted in frequency to correspond to a load that is required for an inverter compressor and thus adjusted in cooling capacity. That is, the compressor 141 may be driven by the invert control to cool the cooling water with optimal efficiency.

An operation of the compressor 141 may be set in a forcibly turned-off state by manipulating the manipulation part 410 by the user. The compressor 141 may be forcibly maintained in the turn-off state when cold water consumption is low at winter, power saving is required, or the cold water is not desired to be used.

Also, the main PCB 510 may control the driving of the compressor 141 and driving of the cooling fan 143. Also, the main PCB 510 may control driving of an agitator motor 153 provided in the cooling tank 150. The motor 153 may be driven to improve the heat-exchange efficiency between the cold water and the cold water passing through the cooling coil and controlled by the main PCB 510. An agitator rotates by the driving of the motor 153, and the cold water may be forcibly convected within the cooling tank 150. As a result, the purified water within the cooling coil may be effectively cooled.

The cold water passing through the cooling tank 150 may be introduced into the water discharge tube 182 through the T-connector, and the cold water passing through the water discharge tube 182 may be dispensed to the outside through the water discharge nozzle 210.

When the purified water discharge valve 198 is opened, the purified water passing through the purified water discharge valve 198 may be introduced into the water discharge tube 182 through the T-connector 181 and then pass through the water discharge tube 182 and be dispensed to the outside through the water discharge nozzle 210.

When the user selects dispensing of the hot water, the purified water may flow to the hot water side 195b of the branch tube 195. A flow rate adjustment valve 199 is opened by the control of the main PCB 510, and water flowing through the flow rate adjustment valve 199 is adjusted to an adequate flow rate for heating of the hot water. That is, an amount of purified water supplied to the hot water tank 161 may be adjusted so that the water is heated at the preset temperature by the induction heating assembly 160.

The purified water passing through the flow rate adjustment valve 199 passes through the hot water tank 161. Also, while passing through the hot water tank 161, the water may be heated at the preset temperature. The hot water tank 161 may be heated in the induction heating manner. For this, an output of magnetic force of a working coil may be adjusted by the control of an induction heating PCB 520.

To drive the induction heating assembly 160, a high voltage is required for the main PCB 510. To supply the high voltage, power may be supplied from a power supply PCB 530 connected to a power line. The power supply PCB 530 may supply adequate power according to whether the induction heating assembly 160 is driven and also supply adequate power to the main PCB 510.

The water within the hot water tank 161 may be heated at the preset temperature by driving the induction heating assembly 160. A hot water temperature sensor may be provided in the hot water discharge valve 183. The hot water temperature sensor may detect a temperature of hot water discharged via the hot water tank 161 to transmit the detected temperature data to the main PCB 510. Also, the output of the working coil may be adjusted based on the hot water temperature data inputted into the main PCB 510.

Also, a tank temperature sensor 162 provided outside the hot water tank 161 may detect a temperature of the hot water tank 161 itself. When the temperature detected by the tank temperature sensor 162 is above the preset temperature to cause possibility of firing, a signal may be transmitted to the main PBC 510 to break a fuse 184. An over load protection (OLP) 147 may be connected to the main PCB 510. The OLP 147 may cut off the power supply when the overload occurs in the compressor 141 to protect the compressor 141.

When the fuse 184 is broken due to an abnormal operation of the induction heating assembly 160, power supplied from the power supply PCB 530 to the induction heating PCB 520 may be cut off to prevent the induction heating assembly 160 from being overheated or damaged.

The hot water heated by passing through the hot water tank 161 by the hot water discharge valve 183 may flow to the water discharge nozzle 210 through the hot water tube 185 and then dispensed to the outside.

When water is dispensed by the manipulation of the water discharge button 420, an LED of the manipulation part 410 may be turned on by the control of a display PCB 430.

A hot water button, a purified water button, and a cold water button may be provided on the manipulation part 410. Here, in case of the hot water button, a temperature of the hot water may be set. Also, an amount selection button for setting an amount of water to be dispensed and a continuous button for selecting continuous dispensing may be provided. Also, a locking button for temporarily blocking the manipulation of the manipulation part 410 may be provided, and a sterilization button for turning on/off the UV sterilization may be provided.

For reference, when a UV sterilization command is inputted through the sterilization button, the UV sterilization of the water discharge nozzle 210 is performed.

In detail, in the state in which the power of the water purifier is turned on, when the sterilization button 416 is pushed, the main PCB 510 may turn on the UV lamp 230 through the UV LED PCB 280 to perform the UV sterilization of the water discharge nozzle 210. Also, the main PCB 510 may turn on the light source 250 through the light source PCB 270 so that the UV lamp 230 and the light source 250 are turned on at the same time. For example, the blue light may be emitted from the light source 250, and the user may recognize the blue light from the outside of the water purifier to visually confirm that the UV sterilization proceeds.

Thereafter, when the UV lamp 230 is turned off due to the operation of the timer or the manipulation (a water discharge command or a sterilization-off command) of the user, the light source 250 is also turned off. Thus, the user may visually confirm that the UV sterilization does not proceed from the outside.

Also, when the water discharge command is inputted through the water discharge button 420, the light source 250 may emit the white light, and the emitted light may be exposed around the water discharge nozzle 210 to shine the cup placed on the tray 300.

Also, information with respect to an operation state or operation degree of the water purifier 10 may be transmitted to a terminal such as a user's mobile phone through a wireless communication module (Wifi) 450 and then displayed. Also, information and operation signal may be transmitted to the wireless communication module (Wifi) 450 through the terminal, and the water purifier 10 may be driven by using the transmitted information.

For example, the user may confirm information such as a lifespan of the filter 120 and a use pattern of the water purifier 10 through an application installed in the terminal. Also, an operation of the water purifier 10 such as setting of a saving mode in which a cold water mode of the water purifier 10 is turned off may be set through the application.

While the water purifier 10 is used, the cooling water within the cooling tank 150 may be drained, and then, new cooling water may be filled into the cooling tank 150.

The invention claimed is:

1. A liquid dispenser comprising:
    a nozzle having an inner surface to supply fluid;
    a case having a lower end through which the nozzle is exposed;
    an ultraviolet (UV) lamp that is provided above the nozzle in the case and selectively emits ultraviolet rays toward the inner surface of the nozzle;
    a window made of a first light transmission material and provided below the UV lamp to protect the UV lamp against the fluid; and
    at least one light source that selectively irradiates light toward the nozzle based on activation of the UV lamp.

2. The fluid dispenser according to claim 1, wherein the UV lamp is provided in the case such that the ultraviolet rays emitted from the UV lamp are not exposed outside of the nozzle.

3. The fluid dispenser according to claim 1, further comprising:
    a diffuser made of a second light transmission material,
    wherein the diffuser is provided between the nozzle and the case,
    light emitted from the light source passes out of the nozzle through the diffuser.

4. The fluid dispenser according to claim 1, wherein the light source includes a printed circuit board (PCB), and a light emitting diode (LED), mounted on a bottom surface of the PCB, the PCB being positioned to be inclined toward the nozzle.

5. The fluid dispenser according to claim 1, wherein the at least one light source includes plurality of light sources that emit light having at least two colors.

6. The fluid dispenser according to claim 1, wherein the light source irradiates light when the ultraviolet rays are emitted from the UV lamp.

7. The fluid dispenser according to claim 1, wherein the light source further emits light when fluid is dispensed from the nozzle.

8. The fluid dispenser according to claim 1, wherein the UV lamp is provided as a UV light emitting diode (LED).

9. The fluid dispenser according to claim 1, wherein the first light transmission material of the window includes a quartz material.

10. The fluid dispenser according to claim 1, wherein the UV lamp intermittently emits ultraviolet rays.

11. The fluid dispenser according to claim 10, wherein the UV lamp, when intermittently emitting ultraviolet rays, is turned on for about 5 minutes and turned off for about 55 minutes.

12. The fluid dispenser according to claim 1, wherein the UV lamp is turned off when fluid is dispensed from the nozzle.

13. The fluid dispenser according to claim 1, further includes comprising:
    a chamber provided below the window to transfer one or more of cooled water or filtered water introduced through a first hose or heated water introduced through a second hose to the nozzle.

14. The fluid dispenser according to claim 1, wherein the nozzle includes an internal piping having a hollow chamber through which fluid is discharged and an upper end connected to the window; and
    an external piping connected to an outer end of the internal piping and exposed outside of the case.

15. The fluid dispenser according to claim 14, wherein the external piping is made of a stainless steel material.

16. The fluid dispenser according to claim 14, wherein the internal piping and the external piping are injection-molded to be integrated with each other to form a single component.

17. The fluid dispenser according to claim 14, wherein:
    the internal piping has a first connection hole into which a first hose supplying cooled water or filtered water is inserted and a second connection hole into which a second hose supplying heated water is inserted, and
    the first connection hole and the second connection hole communicate with the hollow chamber of the internal piping.

18. The fluid dispenser according to claim 17, wherein a hollow packing gasket having elasticity is disposed on each of the first and second connection holes, and
    the first and second hoses are press-fitted into the packing gasket.

19. The fluid dispenser according to claim 18, wherein a protrusion is provided in a circumferential direction on an inner circumferential surface of the packing gasket.

20. The fluid dispenser according to claim 1, wherein a seating gasket on which the window is seated is provided on the nozzle, and
    a seal including an elastic material is provided between the window and the seating gasket.

21. The fluid dispenser according to claim 1, further comprising a manipulation interface provided to move the nozzle.

22. The fluid dispenser according to claim 1, further comprising a water discharge button provided to initiate a flow of water through the nozzle.

23. The water dispenser according to claim 1, further comprising a tray provided below the nozzle.

* * * * *